United States Patent [19]

McGee et al.

[11] 3,899,470

[45] *Aug. 12, 1975

[54] CONTINUOUS PROCESS FOR PREPARATION OF BASIC DYEABLE POLYESTER

[75] Inventors: John W. McGee; Henry L. King, both of Cary, N.C.

[73] Assignee: Monsanto Company, Decatur, Ala.

[ * ] Notice: The portion of the term of this patent subsequent to Aug. 12, 1992, has been disclaimed.

[22] Filed: Aug. 1, 1973

[21] Appl. No.: 384,782

[52] U.S. Cl. ............................................. 260/75 S
[51] Int. Cl. ............................................ C08g 17/01
[58] Field of Search .................................. 260/75 S

[56] References Cited
UNITED STATES PATENTS

| | | | |
|---|---|---|---|
| 3,033,824 | 5/1962 | Huffman | 260/75 |
| 3,060,152 | 10/1962 | Ringwald | 260/75 |
| 3,342,782 | 9/1967 | Barkey | 260/75 |
| 3,424,727 | 1/1969 | Walker | 260/75 |
| 3,636,131 | 1/1972 | Davis et al. | 260/75 |
| 3,639,352 | 2/1972 | Katsuura et al. | 260/75 |
| 3,725,348 | 4/1973 | Harrison et al. | 260/75 |

FOREIGN PATENTS OR APPLICATIONS

| | | |
|---|---|---|
| 1,593,010 | 5/1970 | France |
| 1,952,735 | 7/1970 | Germany |

Primary Examiner—Melvin Goldstein
Attorney, Agent, or Firm—Thomas Y. Awalt, Jr.

[57] ABSTRACT

Fiber-forming cationic dyeable copolyesters are prepared continuously by reacting a low molecular weight glycol-dicarboxylic acid prepolymer having a carboxyl concentration of not more than 2,000 $\mu$eq/g and an intrinsic viscosity of not more than 0.10 with a glycol solution of a bis glycol ester of a difunctional aromatic compound possessing one or more metallo sulfonate groups and of such concentration that the resulting glycol/dicarboxylic acid moiety ratio is at least about 1.6.

14 Claims, No Drawings

CONTINUOUS PROCESS FOR PREPARATION OF BASIC DYEABLE POLYESTER

This invention relates to new and improved high molecular weight modified polyesters. More particularly this invention relates to fiber-forming modified polyesters having improved dyeability and affinity for basic dyes, and to methods for making said modified polyesters.

Polymeric linear polyesters are readily prepared by heating together dihydric alcohols or functional derivatives thereof and dibasic carboxylic acids or polyester-forming derivatives thereof such as acid halides, salts, or simple esters of volatile alcohols. Highly polymerized polyesters can be formed into filaments, fibers, films and the like which can be permanently oriented. The most widely known and most important commercially of the polymeric polyesters is that prepared by the condensation of terephthalic acid or dimethyl terephthalate and ethylene glycol. These polyester materials in drawn fiber or filament form cannot be satisfactorily dyed by the ordinary dyeing procedures used in dyeing cotton, wool, natural silk, and regenerated cellulose. It is recognized that unless the fiberforming polyesters can be readily dyed by commercial dyeing processes, the utility of the polymer in the textile field will be limited. The compact structure of polyethylene terephthalate fibers, the molecules of which are closely packed along the axis of the fiber, makes it quite difficult, except with a limited number of dyes, and under extreme conditions of temperature and pressure, to obtain a satisfactory degree of dye-bath exhaustion, or to secure satisfactory deep shades in the fibers. Absorption and penetration of the dye into the fiber core are limited by inherent properties of the fiber.

A number of methods have been proposed to increase the dyeability of the polyesters and particularly polyethylene terephthalate. However, the methods proposed to date have not proved to be entirely satisfactory.

Modification of the polyesters by incorporating dye sites in the polymers by selected comonomers ordinarily does not produce satisfactory fiber-forming materials, i.e., the dye affinity may be enhanced but other physical properties such as tenacity, melting point and the like are adversely affected. Accordingly, the art has striven for means to increase the dyeability of polyester structures, such as fiber, filaments, films, and the like without adversely affecting other necessary physical properties.

One such method used successfully to improve the dye affinity of polyesters for dispersed acetate dyes and basic dyes is to conduct the polyester reaction in the presence of a small amount of a difunctional agent which possesses a metallo sulfonate group or sulfonate-forming group and two functional or reactive groups such as hydroxyl or carboxyl and esters thereof. By this novel technique, modified polyesters can be produced which not only possess improved dye affinity for dispersed acetate dyes and basic dyes under moderate temperature and pressure and/or with carriers, but also the modified polyesters have the necessary molecular weight required for fiber-forming polyesters and excellent physical properties in fiber form. However it has been found that when starting with terephthalic acid and ethylene glycol, such modification of polyesters often fails to produce satisfactory fiber-forming materials. Attempts to conduct a continuous esterification reaction of terephthalic acid and ethylene glycol in the presence of such sulfonatecontaining compounds as, for example, 5-sodium sulfo isophthalic acid has resulted in excessive diethylene glycol formation, resulting in a polymer with a low melting point and poor heat and light stability in the fiber prepared therefrom.

It is an object of this invention to provide an improved method of continuously producing high molecular weight fiber-forming polyesters which have improved dyeing characteristics, including increased affinity for basic dye stuffs, which polyesters also have a useful balance of other desirable physical properties including high molecular weight, high melting point, and good heat and light stability.

Other objects and advantages of this invention will be apparent from the description thereof which follows.

The objects of this invention are accomplished by reacting continuously under polyesterification conditions an aromatic dicarboxylic acid and a polymethylene glycol to form a prepolymer having a carboxyl level of not more than 2,000 $\mu$ eq/g and an intrinsic viscosity of not more than 0.10, which is then reacted continuously with a glycol solution of a bis glycol ester of a difunctional aromatic compound possessing one or more metallo sulfonate groups and of such concentration that the resulting total glycol/total dicarboxylic acid moiety ratio is at least about 1.6. Excess glycol is removed and polymerization is completed in the usual manner. The polymer obtained is equivalent to polymers obtained using dimethyl terephthalate as a starting material, but does not contain the excessive diethylene glycol which otherwise results in the preparation of cationic dyeable polyesters starting from terephthalic acid.

Generally, the process for producing polyesters using the method of this invention ordinarily comprises preparation either continuously or batchwise forming a reaction mixture comprising an aromatic dicarboxylic acid and an excess of polymethylene glycol. Other additives, such as catalyst, chain branching agents, chain terminating agents and/or cross linking agents and the like may also be added with the initial ingredients if desired. The reaction mixture is metered continuously into a reactor operating at an elevated temperature sufficient to promote the reaction between the acid and the glycol. Preferably the esterification reaction is substantially completed in a single stirred-tank reactor; however, two or more reactors may be used to yield a product which normally consists of a small amount of monomer and a predominate amount of oligomers and polymers of a low degree of polymerization. During this stage of the reaction, the temperature must be such that the water formed is continuously removed by distillation. It may be desirable, although certainly not necessary, to conduct this stage of the reaction under a pressure of from about 5 psig to 100 psig in order to accelerate the reaction and produce a low molecular weight prepolymer. At a point when the degree of esterification of the prepolymer, as indicated by a carboxyl level of not more than 2,000 $\mu$ eq/g (ordinarily at above 78 percent esterification), and when the prepolymer has an intrinsic viscosity of not more than 0.10, the preformed bis glycol ester of the sulfonate-containing compound is added continuously as a glycol solution or slurry of such concentration that the resulting total glycol/total dicarboxylic acid moiety ratio is at least about 1.6. The temperature of the reaction mixture may be raised [the pressure decreased and/or a dry inert gas sweep used] to remove excess glycol and to condense the resulting intermediate product to a highly polymerized polyester. The excess glycol present after the addition of bis glycol ester is removed under relatively mild conditions—with the temperature not to exceed 300° C and preferably not to exceed 260° C in conjunction with low pressure or inert gas sweep—in order to minimize etherification of the glycol. The condensation reaction is preferably conducted in a series of two and preferably more than two reactors generally operating at reduced pressure to aid in removal of the glycol condensation by-product. The reaction preferably is carried out in an oxygen free atmosphere.

The dicarboxylic acid employed is preferably terephthalic acid in view of its commercial availability at a relatively low cost and in view of the desirable properties of the polymer that can be produced by using this specific acid. Aromatic dicarboxylic acids which may be used in accordance with the present invention include those having the general formula

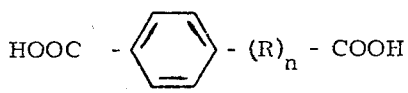

wherein $n$ is either zero or one, and R is a radical selected from the group consisting of (a) an alkylene radical containing 1 to 8 carbon atoms;

(b) 

(c) 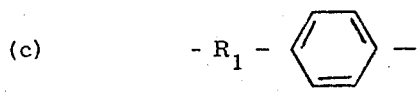

wherein $R_1$ is an alkylene group containing 1 to 8 carbon atoms;

(d) 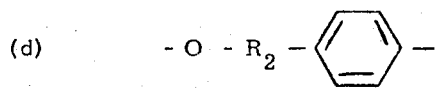

wherein $R_2$ is an alkylene group containing 1 to 8 carbon atoms; and (e) 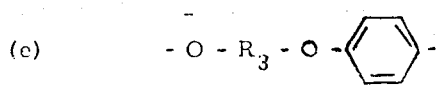

wherein $R_3$ is an alkylene group containing from 1 to 8 carbon atoms.

As examples of suitable aromatic p-dicarboxylic acids having the above general formulas there may be named: terephthalic acid; p,p'-dicarboxydiphenyl; p,p'-dicarboxydiphenylmethane; p,p'-dicarboxydiphenylethane; p,p'-dicarboxydiphenylpropane; p,p'-dicarboxydiphenylbutane; p,p'-dicarboxydiphenylpentane; p,p'-dicarboxydiphenylhexane; p,p'-dicarboxydiphenylheptane; p,p'-dicarboxydiphenyloctane; p,p'-dicarboxydiphenoxymethane; p,p'-dicarboxydiphenoxyethane; p,p'-dicarboxydiphenoxypropane; p,p'-dicarboxydiphenoxybutane; p,p'-dicarboxydiphenoxypentane; p,p'-dicarboxydiphenoxyhexane and the like. Other useful aromatic dicarboxylic acids that may be used include naphthalene dicarboxylic acids such as 2,6-dicarboxynaphthalene, 2,7-dicarboxynaphthalene, and the like.

Copolyesters can also be prepared in accordance with the present invention. For example, mixtures of the aromatic p-dicarboxylic acids defined above or these acids mixed with up to 50 weight percent of an aromatic m-dicarboxylic acid such as isophthalic acid or xylidinic acid may be employed to make a polyester having particularly desirable physical properties. It is necessary that the sole reactive groups of the acid be the two carboxyl groups. Therefore, it will be appreciated that the aromatic dicarboxylic acid may contain substituents that do not enter into the polycondensation reaction. For example, durene, 1,4-dicarboxylic acid may be employed. The invention also includes processes as described above wherein polyesters can be prepared by replacing in part the aromatic dibasic carboxylic acid with up to 30 percent by weight of an aliphatic dicarboxylic acid, such as succinic acid, adipic acid, sebacic acid, alpha, alpha-dimethylglutaric acid, itaconic acid, betaoxydipropionic acid, alpha, alpha-oxydibutyric acid, fumaric acid, and the like. Longer chain aliphatic dicarboxylic acids such as 1,20-eiconsanedioic acid, 8-ethyl-1, 18-octadecanedioic acid, a mixture thereof, and the like may also be substituted in part for the aromatic dicarboxylic acid. For the purposes of this invention, "polyesters" will be considered include at least 85 percent by weight of the ester of a dihydric alcohol and a dicarboxylic acid.

The polymethylene glycol employed in the process of the present invention may be any glycol containing 2 to 10 carbon atoms or polyesterforming derivatives thereof, and more preferably are polymethylene glycols of the general formula $HO(CH_2)_nOH$, wherein n is an integer from 2 to 10 and cyclohexane dimethanol. Illustrative of suitable aliphatic glycols that may be used for the purposes of this invention are ethylene glycol, 1,5-pentanediol, 1,3-propanediol, 1,6-hexanediol, 1,7-heptanediol, 1,8-octanediol, 1,9-nonanediol, 1,10-decanediol and the like. It is preferred that the glycol used be ethylene glycol.

At least about one molar proportion of the glycol per molar proportion of the acid is employed. However, a molar excess of the glycol is usually employed in the preparation of polyesters. Normally, from about 1.3 to 5 moles of glycol per mole of acid are used.

The sulfonate-containing compound of which the bisester is employed, is any organic compound containing at least one sulfonate group and capable of entering into a polyesterification reaction. The sulfonatecontaining additive will react with the dicarboxylic acid and the polymethylene glycol prepolymer and will form an integral part of the polymer structure.

Illustrative of sulfonate-containing compounds which may be employed for the purpose of this invention are compounds of the formula

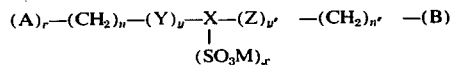

wherein
a.

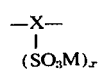

is a member of the class consisting of a metallic salt of a divalent arylene radical, each being of such character that the —$SO_3M$— groups present are separated from ester-forming units by at least 3 carbon atoms and $x$ is an integer of 1 to 2, b. Y and Z are selected from the group consisting of oxyalkyl, oxyaryl, oxyalkyleneoxyaryl and poly(oxypolymethylene) oxyaryl radicals and $y$ and $y'$ are integers of 0 to 1.

c. $n$ and $n'$ are integers of 0 to 10, and d. A is a member selected from the ester-forming units COOH, COOR, R representing a lower alkyl group of 1 to 6 carbon atoms, B is a member selected from the group consisting of A and hydrogen, and $r$ is an integer of 1 to 2, with the proviso that when $r$ is 2, then B must be hydrogen.

These compounds are well known in the prior art, and descriptions of such compounds may be found in U.S. Pat. Nos. 3,018,272; 3,033,824; 3,077,493; 3,164,566; 3,164,567; 3,164,570; 3,184,434; 3,166,531; and 3,185,671. Preferred is the bis glycol ester of 5-sodium sulfo isophthalic acid, which is prepared separately from dimethyl-5-sodium sulfo isophthalate and ethylene glycol or by esterification of 5-sodium sulfo isophthalic acid. The bis glycol ester is prepared as a solution in ethylene glycol and fed to the preformed acid glycol prepolymer as described above.

It is difficult to prepare the cationic dyeable polyester polymer from terephthalic acid (as opposed to dimethyl terephthalate) employing, for example, 5-potassium sulfo isophthalic acid or 5-sodium sulfo isophthalic acid because of excessive side reactions in which diethylene glycol (DEG) is produced. Efforts to minimize these side reactions have resulted in the finding that the addition of certain basic salts such as lithium acetate to the formulation greatly reduced DEG formation, but the use of basic salts to depress the formation of DEG in continuous processes was not as successful as in batch processes and some cationic dyeability was lost.

Other attempts to minimize formation of diethylene glycol in preparing cationic dyeable polyesters from terephthalic acid included the use of esters such as dimethyl-5-potassium sulfo isophthalate in lieu of the free acid, 5-potassium sulfo isophthalic acid in an attempt to lower DEG formation by using a less acidic reaction media during esterification, it being known that DEG formation is acid catalyzed. High levels of DEG were generated, and a generally poor polymer was produced. Low melting point, poor spinning and drawing were noted.

The following examples are cited to illustrate the invention. They are not intended to limit it in any way.

EXAMPLE 1

For the preparation of the bis glycol ester from the dimethyl ester, a three-gallon, stirred-tank reactor equipped with rectification column and condenser was charged with 3,333 grams of sodium 5-sulfo-dimethylisophthalate, 5,586 grams of ethylene glycol and 22.8 grams of lithium acetate dihydrate. The reactor was purged with nitrogen and put under a 5 psig nitrogen blanket prior to start of the heating cycle. When the reaction mixture temperature reached 140° C, which is slightly below the temperature at which significant transesterification takes place, the reactor pressure was reduced to atmospheric by gradually releasing nitrogen through the rectification column and condenser. In approximately 45 minutes after beginning the heating cycle, the reaction mixture reached 180° C. After maintaining this temperature for 10 minutes, the temperature was increased to 200° C at a rate of 5° C per 10 minutes. To minimize loss of ethylene glycol during distillation of the methanol by-product, the top of the packed rectification column was maintained at 66° to 70° C by controlling the reflux rate to the column. The mixture was held at 200° C for 40 minutes, the heat to the reactor and reflux to the column were stopped and the batch forced by nitrogen pressure through a nominal 5 $\mu$ glass fiber filter into a nitrogen blanketed receiver. The solution containing approximately 48 weight percent of the bis-glycol ester was cooled and further diluted with ethylene glycol to 21 weight percent. The theoretical degree of polymerization of the bis-glycol ester was 1.14. Analytical tests showed a carboxyl concentration of 13 $\mu$ eq/gm of the bis glycol ester, a carboxylate concentration of 60 $\mu$ eq/gm of the bis glycol ester and a diethylene glycol concentration (DEG) of 0.56 weight percent based on weight of the bis glycol ester.

While this example employs a mole ratio of ethylene glycol to dimethyl-5-sodium sulfo isophthalate of 8 to 1, other mole ratios can be employed, so long as there is an excess of ethylene glycol. Ratios of 4:1 have been effectively employed. Any common ester-interchange catalyst may be used. For storage at ambient temperature over long periods of time it is advantageous to dilute the reaction product to 20–22 percent bis glycol ester to prevent crystallization of the bis glycol ester.

EXAMPLE 2

For the preparation of the bis glycol ester from the acid, a three-gallon, stirred tank reactor equipped with rectification column and condenser was charged with 3,018 grams of sodium-5-sulfoisophthalic acid, 5,586 grams of ethylene glycol and 30.0 grams of lithium acetate dihydrate. The reactor was purged with nitrogen and put under a 5 psig nitrogen blanket prior to start of the heat-up cycle. When the reaction mixture temperature reached 180° C, which is slightly below the temperature at which significant esterification takes place, the reactor pressure was reduced to atmospheric by gradually releasing nitrogen through the rectification column and condenser. In approximately 35 minutes after beginning the heat-up cycle, the reaction mixture reached 190° C. After maintaining this temperature for 10 minutes, the temperature was increased to 205° C at a rate of 5° C per 10 minutes. To minimize loss of ethylene glycol during distillation of the water by-product, the top of the packed rectification column was maintained at 101° to 106° C by controlling the reflux rate to the column. The mixture was held at 205° C for 60 minutes then the heat to reactor and the reflux to the column were stopped, 50 grams of Darco G-60 activated carbon were added to the hot batch and mixed for 20 minutes. (Due to the presence of impurities in the sodium-5-sulfoisophthalic acid, it was necessary to decolorize the solution to obtain an almost colorless, clear product.) The batch was then forced by nitrogen pressure from the reactor through a Sparkler filter precoated with analytical grade Celite filter aid to a nitrogen blanketed receiver. The solution containing approximately 48 weight percent of the bis-glycol ester was cooled and further diluted with ethylene glycol to approximately 20 weight percent. The theoretical degree of polymerization of the bis-glycol ester was 1.14. Analytical results gave a carboxyl concentration of 108 $\mu$ eq/gm of the bis glycol ester, a carboxylate concentration of 86 $\mu$ eq/gm of the bis glycol ester and a diethylene glycol concentration of 10 weight percent based on weight of the bis glycol ester.

In the above reaction, esterification was conducted at 205° C. Lower reaction temperatures may be employed in conjunction with longer reaction times. The lithium acetate is employed to suppress formation of diethylene glycol, and the amount employed is not critical.

EXAMPLE 3

This example describes the preparation of a cationic dyeable polyester via a continuous terephthalic acid (TA) process using the ethylene glycol (EG) solution of the bis glycol ester described in Example 1.

A TA-EG slurry batch containing 40.0 lbs. of TA, 30.0 lbs. of EG, 2.24 grams of pentaerythritol, 16.80 grams of triphenyl phosphite, 13.44 grams of lithium acetate dihydrate, 1.00 gram of a commercial antifoam agent (otherwise non functional) known as Antifoam "A", 220.6 grams of a monohydroxyl alkoxy poly)oxyalkylene) glycol having the structural formula:

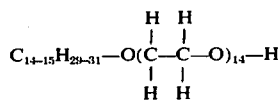

4.75 grams of manganese acetate tetrahydrate, 11.20 grams of 2,2'-ethylenedioxy-bis (1,3,2-dioxyasitibolane) and 67.2 grams of titanium dioxide was metered at 55.0 gm/min into a stirred tank reactor operating at 250° C under a pressure of 20 psig with a residence time of 2.5 hours. The product from this reactor had an intrinsic viscosity of 0.07 and a carboxyl end group concentration of 760 $\mu$ eq/gm. By-product water and EG were continuously distilled from the reactor and condensed.

This prepolymer along with 7.26 gm/min of the solution of bis glycol ester described in Example 1 were metered into a second stirred tank reactor operating at 230° C under a reduced pressure of 260 mm Hg with a residence time of 2.3 hours. The molar ratio of total EG to TA entering the second reactor was 1.82 and the ratio of total EG to total dicarboxylic acid was 1.77. The product from reactor 2 had an intrinsic viscosity of 0.09 and a carboxyl end group concentration of 100 $\mu$ eq/gm. Water and EG were continuously distilled from the reactor and condensed.

The prepolymer was further condensed in a bubble-cap column operating at atmospheric pressure with a countercurrent flow of nitrogen at 0.34 standard cubic feet per minute. The column product was at 260° C and had an intrinsic viscosity of 0.18 and a carboxyl end group concentration of 42 $\mu$ eq/gm. Condensation was completed in a rotating cage finisher operating at 1.6 mm Hg and 265° C with a residence time of 1.9 hours and product rate of 37.8 gm/min. This copolymer was spun and drawn into a continuous filament yarn having an intrinsic viscosity of 0.54, a carboxyl end group concentration of 20 $\mu$ eq/gm, a diethylene glycol (DEG) concentration of 1.5 wt. percent and melting point of 249° C. The yarn had a tenacity of 3.5 gm/denier, a sulfonate group concentration of 108 $\mu$ eq/gm and a basic dye uptake of 103 $\mu$ eq/gm.

EXAMPLES 4–8

In these examples, the same process equipment was employed as above, with introduction of the ethylene glycol solution containing the bis glycol ester of 5-sodium sulfo isophthalic acid to the reactor tails of the first reactor. The reactor tail products and the fiber are described in the following table:

TABLE I

|  | Example 4 | Example 5 | Example 6 | Example 7 | Example 8 |
|---|---|---|---|---|---|
| Reactor 1 Product |  |  |  |  |  |
| [$\eta$] | .092 | .062 | .062 | .083 | .083 |
| COOH, $\mu$eq/gm | 926 | 1960 | 1960 | 769 | 769 |
| DEG. wt. % | 0.8 | 0.5 | 0.5 | 0.6 | 0.6 |
| % Esterification | 91 | 79 | 79 | 92 | 92 |
| Reactor 2 Conditions |  |  |  |  |  |
| Injection rate of bis glycol ester of sodium sulfo isophthalic acid, gm/min | 1.43 | 1.43 | 1.43 | 1.42 | 1.37 |
| Ethylene glycol injected with bis glycol ester, gm/min | 5.87 | 5.45 | 5..45 | 5.98 | 5.54 |
| Temperature, °C | 230 | 230 | 230 | 230 | 230 |
| Pressure, mm Hg | 760 | 258 | 258 | 760 | 760 |
| Residence Time, hr | 0.8 | 2.3 | 2.3 | 0.7 | 1.8 |
| Agitator rpm | 1600 | 950 | 0 | 1600 | 1600 |
| Molar ratio of EG to total dicarboxylic acids in Feed | 1.6 | 1.7 | 1.7 | 1.7 | 1.7 |
| Reactor 2 Product |  |  |  |  |  |
| [$\eta$] | .076 | .103 | .099 | .083 | .081 |
| COOH, $\mu$eq/gm | 305 | 263 | 304 | 111 | 222 |
| DEG. wt. % | 1.0 | 1.8 | 1.9 | 1.0 | 0.8 |
| Polymer Product |  |  |  |  |  |
| Flow rate, gm/min. | 38.0 | 38.0 | 38.0 | 38.0 | 38.0 |
| [$\eta$] | 0.53 | 0.57 | 0.54 | 0.54 | 0.54 |
| COOH, $\mu$eq/gm | 20.7 | 20.2 | 21.4 | 14.4 | 14.6 |
| DEG. wt. % | 1.4 | 3.1 | 1.9 | 1.1 | 1.1 |
| —SO$_3$Na, $\mu$eq/gm | 104 | 97 |  | 104 | 100 |
| Melt point, °C | 247 | 244 | Not | 250 | 249 |
| Brightness | 79 | 81 | Spinnable | 83 | 82 |
| Purity | 1.1 | 1.4 |  | 1.8 | 2.0 |
| Chemstrand Whiteness | 87 | 87 |  | 87 | 86 |

Example 4 shows utilization of a relatively high intrinsic viscosity in the prepolymer. In this example some depolymerization was permitted in the second reactor prior to the continuation of the condensation reaction. Example 5 shows utilization of a relatively high carboxyl prepolymer with satisfactory results; however, in general a product with lower diethylene glycol concentration can be produced using a prepolymer having a lower carboxyl end group concentration. In Example 5, a relatively low molecular weight prepolymer was employed for the addition of the sulfonate-containing monomer followed by subsequent condensation in reactor 2. Example 6 illustrates the necessity for adequate mixing after addition of the bis glycol ester of 5-sodium sulfo isophthalic acid. In Example 6 the four inch diameter second reactor impeller, which had been rotated at 950 rpm in example 5, was not in motion. The polymer was not spinnable because of large globules of additive in the polymer. Example 7 illustrates a process in which no net polycondensation or depolymerization takes place in reactor 2. Example 8 illustrates that a satisfactory polymer can also be produced using the bis glycol ester additive prepared by esterification of sodium sulfo isophthalic acid as described in Example 2.

EXAMPLES 9–11

In these examples, the equipment described in Example 3 was operated without using the second stirred tank reactor. The bis glycol ester solution was metered into either reactor 1 or into the transfer line upstream of a 21 element Kenics static mixer installed between reactor 1 and the column.

TABLE II

|  | Example 9 | Example 10 | Example 11 |
|---|---|---|---|
| Reactor 1 Product | | | |
| $[\eta]$ | 0.100 | 0.071 | 0.081 |
| COOH, µeq/gm | 586 | 536 | 430 |
| DEG, wt. % | — | — | 6.4 |
| % Esterification | 94 | 94 | 95 |
| Injection rate of bis glycol ester of sodium sulfo isophthalic acid, gm/min. | 1.35 | 1.63 | 1.18 |
| Ethylene glycol injected with bis glycol ester, gm/min. | 1.21 | 4.57 | 1.05 |
| Molar ratio of EG to total dicarboxylic acids in column feed | 1.2 | 1.8 | 1.7 |
| Polymer Product | | | |
| Flow rate, gm/min. | Unreacted bis glycol ester additive plugged column | 37.8 | 25.0 |
| $[\eta]$ | | 0.54 | 0.58 |
| COOH µeq/gm | | 22.3 | — |
| DEG wt. % | | 1.8 | 5.6 |
| —SO$_3$Na, µeq/gm | | — | — |
| Melt point, °C | | 244 | 214 |
| Brightness | | 82 | 80 |
| Purity | | 2.8 | 5.2 |
| Chemstrand Whiteness | | 82 | 51 |

Example 9 illustrates the addition of a relatively concentrated bis glycol ester solution to a prepolymer having a relatively high molecular weight. This combination gave a feed to the column having a molar ratio of total EG to total dicarboxylic acids of only 1.2 and resulted in globules of unreacted additive plugging the column. Example 10 illustrates the addition of a more dilute bis glycol ester solution to a prepolymer having a relatively low molecular weight. This combination gave a molar ratio of total EG to total dicarboxylic acids of 1.8 and resulted in a spinnable, homogeneous polymer. Example 11 illustrates the addition of the bis glycol additive into reactor 1. This resulted in a prepolymer having high DEG content and a spinnable, homogeneous polymer having an undesirably low melting point and high DEG content.

Tristimulus color was measured in a tristimulus colorimeter, Kollmorgen Corp. (IDL) large sphere coloreye. Relative brightness is indicated directly by the value of Y. Chromaticity coordinates x and y are calculated from the reflectance measurements, as well known in the art of colorimetry, and more particularly, as described at pages 9–10 of the Massachusetts Institute of Technology *Handbook of Colorimetry* (1936 – The Technology Press, Massachusetts Institute of Technology, Cambridge, Mass.). From the values x and y, purity (percent) and dominate wavelength (DWL in nm) is determined from chart 12$a$ in the above cited publication. Chemstrand whiteness ($W_c$) is calculated using the following equation:

$$W_c = 10\,(Y - 2p^2)^{1/2}$$

where:
$Y = Y_{CIE}$
$p =$ purity

The number of dye sites actually present in the filament, in terms of microequivalents per gram (—SO$_3$Na), may be determined as follows. An accurately weighed polymer sample of about 0.001 grams is placed in a 125 ml Erlenmeyer flask fitted with a ground glass stopper. 25 ml of a melted xylenol-chloroform is pipeted into the flask, and the sample is refluxed on a water-cooled condenser until it dissolves in about 15 minutes. The sample is then cooled to 40° C or below and 75 ml chloroform is added through the condenser. The sample is then stirred and run through an ion exchange column at a rate of about 8 ml/minute. The sample is then washed with about 300 ml chloroform at the same rate of elution. The sample and washings are collected in a 500 ml flask. 5 drops of neutralized thymol blue indicator are added, and the sample is titrated with a standard ethanolic KOH using a 1 ml microburet and magnetic stirring. Titration is to a pure yellow color.

The polymer solvent is 2,6 dimethyl phenol (xylenol) of which 500 grams is added to 85 ml of chloroform, the solvent being melted in a water bath at about 60° C just prior to use.

The ethanolic KOH titrant is prepared by dissolving 14 grams of reagent grade (85%) potassium hydroxide in 1,000 cc of absolute ethanol. It is standardized against potassium hydrogen phthalate using phenolphthalein indicator, and protected against atmospheric carbon dioxide.

By measuring specific viscosity (nsp) at 25° C and at a given concentration (½–4 percent) of the prepolymer in a solvent having a molar ratio: 2 phenol/1 trichlorophenol, the intrinsic viscosity ($\eta$) is then calculated using the relationship $$[\eta] = (\sqrt{2/c}\,)\,[\eta\,sp - 1\,n\eta_{rel}]^{1/2} \quad \eta_{rel} = 1 + \eta sp$$

As is well known in the art, the carboxyl end group concentration can be determined by titration of the prepolymer with potassium hydroxide. Ethylene glycol/dicarboxylic acid molar ratios can be determined, as is well known in the art, by material balance.

DEG is determined by gas chromatographic analysis after saponification of the polymer or prepolymer.

Melting points were determined from endotherms obtained with a duPont Differential Thermal Analyzer.

The carboxyl concentration of 2,000 $\mu$ eq/g is roughly equivalent to a percentage of esterification of about 78. The theoritical lower limit on the intrinsic viscosity of the prepolymer which is suitable for the addition of the bis glycol ester of the difunctional aromatic compound possessing the sulfonate group is the intrinsic viscosity of a prepolymer consisting entirely of monomer. Such a prepolymer would not normally be obtained and the intrinsic viscosity would not normally be less than about 0.05 with a degree of polymerization of about 2 to 6.

It must be appreciated that although the intrinsic viscosity of the prepolymer should not exceed about 0.1, an equivalent process may employ a prepolymer of yet higher viscosity provided that subsequent extreme depolymerization measures are taken so the depolymerization occurs to an intrinsic viscosity of 0.1 or below, in the presence of the difunctional aromatic compound possessing the sulfonate group.

It is understood that the changes and variations may be made in the present inventions without departing from the spirit and scope thereof as defined in the appended claims.

We claims:

1. A method for producing fiber-forming modified polyesters which comprises (1) forming a reaction product prepolymer consisting of at least 85 percent by weight of the polyester of an aromatic dicarboxylic acid and a polymethylene glycol selected from the group consisting of those having the formula $HO(CH_2)_nOH$, wherein $n$ is an integer from 2 to 10, and cyclohexane dimethanol, by reacting said acid and said glycol under esterification conditions until said reaction product has a carboxyl level of not more than 2000 $\mu$ eq/g and an intrinsic viscosity of not more than 0.10; and (2) continuously reacting with said reaction product prepolymer a glycol solution of a bis glycol ester of a difunctional aromatic compound possessing a metallo sulfonate group of such concentration that when said bis glycol ester is mixed with said prepolymer, the resulting glycol/dicarboxylic acid moiety ratio is at least about 1.6; and copolymerizing and polycondensing said reactants at a temperature in the range of from about 120° C to about 300° C until the resulting polymer attains an intrinsic viscosity in the range of about 0.3 to 0.8.

2. The method of claim 1 wherein said carboxyl level of the prepolymer is about 500–900 $\mu$ eq/g.

3. The method of claim 1 wherein the intrinsic viscosity of said prepolymer is about 0.06–0.08.

4. The method of claim 1 wherein the content of diethylene glycol in said prepolymer is not more than about 0.60 percent by weight.

5. The method of claim 1 wherein the resulting total glycol/total dicarboxylic acid prepolymer reaction product moiety ratio is about 1.3/1.

6. The method of claim 1 wherein said resulting total glycol/total dicarboxylic acid moiety ratio after addition of sulfonate containing additive is 1.6–1.9/1.

7. The method of claim 1 wherein said aromatic compound possessing a sulfonic acid group is 5-sodium sulfo isophthalic acid.

8. The method of claim 1 wherein said reaction product prepolymer consisting of at least 85 percent by weight of the polyester of an aromatic dicarboxylic acid and polymethylene glycol is produced continuously starting with the dicarboxylic acid and the polymethylene glycol.

9. The method of claim 1 wherein excess glycol is removed from the reaction product prepolymer after addition of the bis glycol ester at a temperature not to exceed 260° C.

10. The method of claim 9 wherein excess glycol is removed at subatmospheric pressure.

11. The method of claim 9 wherein excess glycol is removed under an inert gas.

12. The method of claim 1 wherein all phases are conducted continuously.

13. The method of claim 1 wherein the dicarboxylic acid is terephthalic acid.

14. The method of claim 1 wherein the glycol is ethylene glycol.

* * * * *